(12) United States Patent
Marcouiller et al.

(10) Patent No.: US 8,262,294 B2
(45) Date of Patent: Sep. 11, 2012

(54) FIBER OPTIC DUST CAP AND CONNECTOR FOR TERMINATING MULTI-FIBER OPTICAL CABLES

(75) Inventors: Thomas Marcouiller, Shakopee, MN (US); Thomas P. Huegerich, Manchester Center, VT (US); Tim Redmann, Carver, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 300 days.

(21) Appl. No.: 12/700,335

(22) Filed: Feb. 4, 2010

(65) Prior Publication Data

US 2011/0188813 A1 Aug. 4, 2011

(51) Int. Cl.
G02B 6/36 (2006.01)
(52) U.S. Cl. .......................................... 385/53
(58) Field of Classification Search ................ None
See application file for complete search history.

(56) References Cited

U.S. PATENT DOCUMENTS

| | | | |
|---|---|---|---|
| 5,214,730 A | 5/1993 | Nagasawa et al. | |
| 5,317,663 A | 5/1994 | Beard et al. | |
| 5,737,463 A | 4/1998 | Weiss et al. | |
| 5,867,621 A | 2/1999 | Luther et al. | |
| 6,085,003 A | 7/2000 | Knight | |
| 6,227,717 B1 * | 5/2001 | Ott et al. | 385/53 |
| 6,340,247 B1 | 1/2002 | Sakurai et al. | |
| 6,712,524 B2 | 3/2004 | Beatty et al. | |
| 6,886,988 B2 | 5/2005 | Brown et al. | |
| 7,164,840 B2 | 1/2007 | Hsieh | |
| 7,198,409 B2 | 4/2007 | Smith et al. | |
| 7,218,827 B2 | 5/2007 | Vongseng et al. | |
| 7,233,731 B2 | 6/2007 | Solheid et al. | |
| 7,245,813 B2 | 7/2007 | Brown et al. | |
| 7,277,620 B2 | 10/2007 | Vongseng et al. | |
| 7,407,330 B2 | 8/2008 | Smith et al. | |
| 7,457,503 B2 | 11/2008 | Solheid et al. | |
| 7,519,259 B2 | 4/2009 | Smith et al. | |
| 7,565,053 B2 | 7/2009 | Zimmel et al. | |
| 7,583,883 B2 | 9/2009 | Kowalczyk et al. | |
| 7,809,233 B2 | 10/2010 | Smith et al. | |
| 7,809,234 B2 | 10/2010 | Smith et al. | |
| 7,841,775 B2 | 11/2010 | Smith et al. | |
| 7,844,159 B2 | 11/2010 | Solheid et al. | |
| 7,945,137 B2 | 5/2011 | Kowalczyk et al. | |
| 7,988,367 B2 * | 8/2011 | Gurreri et al. | 385/53 |

(Continued)

OTHER PUBLICATIONS

USCONEC Technical Drawing No. C10063, Rev B, of Protective Cap, MTP, 1 page (known at least as of Apr. 22, 2009).

(Continued)

Primary Examiner — Sung Pak
(74) Attorney, Agent, or Firm — Merchant & Gould P.C.

(57) ABSTRACT

A dust cap is adapted to cover an end of a fiber optic connector that includes a release sleeve. The dust cap includes a sleeve with an open end and a closed end, at least one resilient latch with a retainer, and a sealing surface. The dust cap is installed on the fiber optic connector by placing the open end of the sleeve over the end of the fiber optic connector. The dust cap is retained on the fiber optic connector by capturing the retainer of the resilient latch between an interior portion of the release sleeve and a retaining pocket of the fiber optic connector. The sealing surface of the dust cap is adapted to sealingly engage a perimeter of the release sleeve when the dust cap is fully installed.

26 Claims, 8 Drawing Sheets

U.S. PATENT DOCUMENTS

| | | | |
|---|---|---|---|
| 8,041,177 B2* | 10/2011 | Zimmel et al. | 385/139 |
| 2003/0002812 A1* | 1/2003 | Lampert | 385/78 |
| 2003/0123812 A1 | 7/2003 | Beatty et al. | |
| 2004/0096165 A1 | 5/2004 | Childers et al. | |
| 2005/0220434 A1* | 10/2005 | Hsieh | 385/134 |
| 2005/0232551 A1* | 10/2005 | Chang et al. | 385/76 |
| 2007/0217749 A1* | 9/2007 | Jong et al. | 385/88 |
| 2008/0304804 A1 | 12/2008 | Zimmel et al. | |
| 2008/0317425 A1 | 12/2008 | Smith et al. | |
| 2009/0074372 A1 | 3/2009 | Solheid et al. | |
| 2009/0087157 A1 | 4/2009 | Smith et al. | |
| 2009/0190896 A1 | 7/2009 | Smith et al. | |
| 2009/0285541 A1 | 11/2009 | Kowalczyk et al. | |
| 2010/0111484 A1* | 5/2010 | Allen | 385/135 |
| 2011/0013876 A1* | 1/2011 | Marcouiller et al. | 385/139 |

OTHER PUBLICATIONS

USCONEC Technical Drawing No. C10254, Rev A, of Dust Cap, Adapter, MTP, 1 page (known at least as of Apr. 22, 2009).
USCONEC Technical Drawing No. C10821, Rev D, of Kit, MTP Connector, Ribbon, 2 pages (known at least as of Apr. 22, 2009).
USCONEC Technical Drawing No. C10449, Rev A, of Ferrule Cover, MT, 1 page (known at least as of Apr. 22, 2009).
USCONEC Technical Drawing No. C8190, Rev. B, of Kit, MTP Connector, Round Cable, 2 pages (known at least as of Apr. 22, 2009).
USCONEC Technical Drawing No. C7721, Rev A, of Dust Cap, MTP/MT, MM, 1 page (known at least as of Apr. 22, 2009).
USCONEC Technical Drawing No. C10823, Rev C, of Kit, MTP Connector, Short, 2 pages (known at least as of Apr. 22, 2009).
USCONEC Technical Drawing No. C10822, Rev D, of Kit, MTP Connector, Strain Relief, 2 pages (known at least as of Apr. 22, 2009).

* cited by examiner

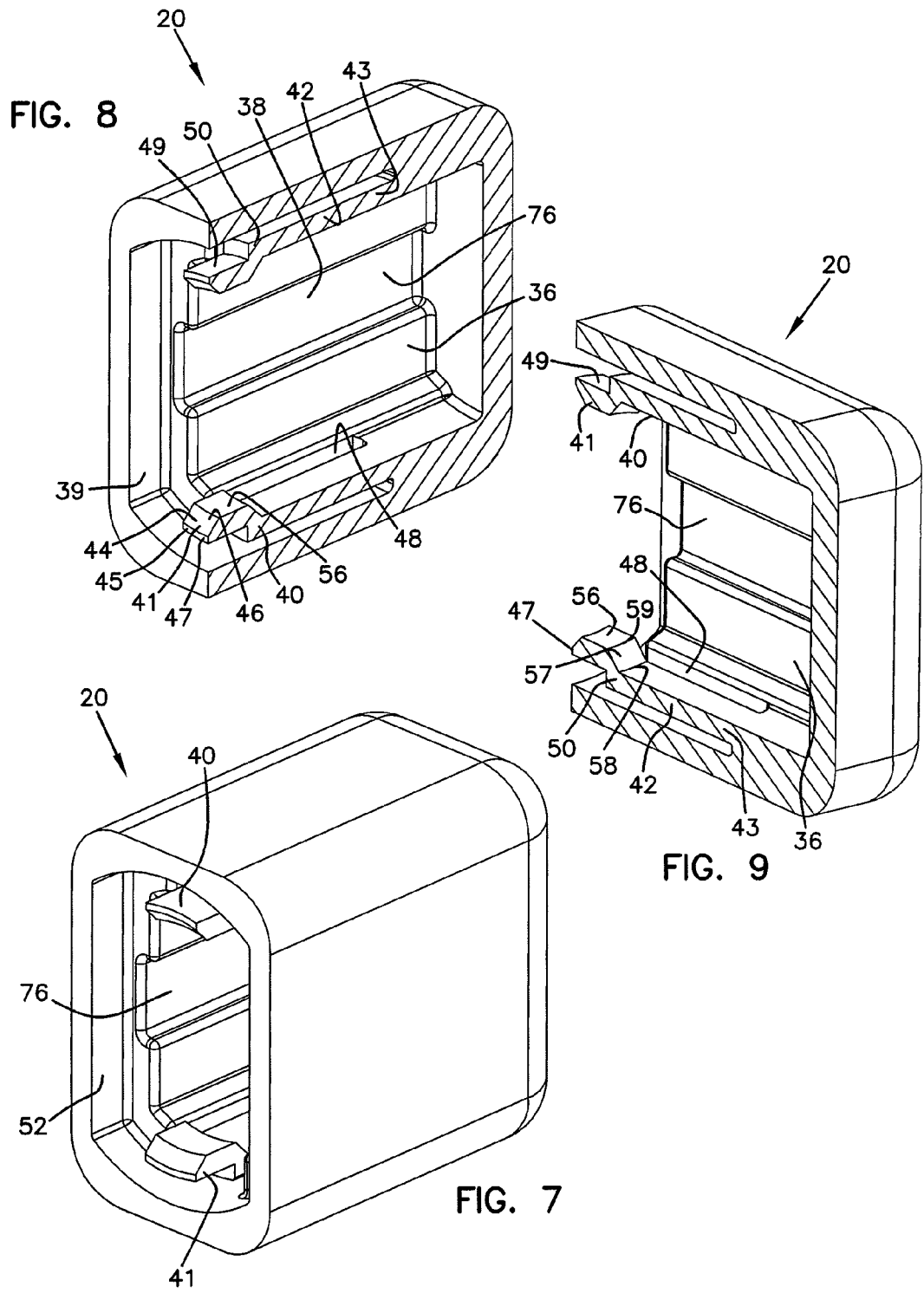

FIBER OPTIC DUST CAP AND CONNECTOR FOR TERMINATING MULTI-FIBER OPTICAL CABLES

TECHNICAL FIELD

The present disclosure relates to fiber optic data transmission, and more particularly to fiber optic cable connection systems.

BACKGROUND

Fiber optic cables are widely used to transmit light signals for high speed data transmission. The fiber optic cables each include an optical fiber or optical fibers. The optical fibers function to carry the light signals (i.e., optical signals). A typical optical fiber includes an inner core surrounded by a cladding that is covered by a coating.

Fiber optic cable connection systems are used to facilitate connecting and disconnecting the fiber optic cables in the field without requiring a splice. A typical fiber optic cable connection system for interconnecting two fiber optic cables includes fiber optic connectors (i.e., optical fiber connectors) mounted at ends of the fiber optic cables, and an adapter for mechanically and optically coupling the fiber optic connectors together. The fiber optic connectors generally include ferrules that support ends of the optical fibers of the fiber optic cables. End faces of the ferrules are typically polished and are often angled. The adapter includes co-axially aligned ports (i.e., receptacles) for receiving the fiber optic connectors desired to be interconnected. The adapter may include an internal sleeve that receives and aligns the ferrules of the fiber optic connectors when the connectors are inserted within the ports of the adapter. With the ferrules and their associated fibers aligned and abutted within the sleeve of the adapter, a fiber optic signal can pass from one fiber to the next corresponding fiber via an optical interface created by this arrangement. The adapter also typically has a mechanical fastening arrangement (e.g., a snap-fit arrangement, a latch, etc.) for mechanically retaining the fiber optic connectors within the adapter.

A prior art fiber optic connection system is disclosed at U.S. Pat. No. 5,214,730 to Nagasawa et al., issued May 25, 1993, that is hereby incorporated by reference in its entirety. Prior art fiber optic connectors include fiber optic connectors that are available from US Conec Ltd. of Hickory, N.C., USA as part numbers C10821, C10822, C8190, and C10823. Fiber optic connectors related to part numbers C10821, C10822, C8190, and C10823 are known as MTP®, connectors. Other prior art fiber optic connection systems include SC type fiber optic connectors and adapters, disclosed at U.S. Pat. No. 5,317,663, that is hereby incorporated by reference in its entirety. MTP®, connectors are described and illustrated at U.S. Provisional Patent Application No. 61/226,449, filed Jul. 17, 2009, entitled "Fiber Optic Dust Cap and Connector for Terminating Multi-Fiber Optical Cables", that is hereby incorporated by reference in its entirety.

Dust caps have been developed to protect an example MTP®, connector 100, and in particular a ferrule 150 of the connector 100, from contamination when disconnected. Such a dust cap is disclosed at U.S. Pat. No. 7,245,813 to Brown et al., issued Jul. 17, 2007, hereinafter referred to as the '813 dust cap. A commercial embodiment of the '813 dust cap is available from US Conec Ltd. of Hickory, N.C., USA as part number C7721. Another such dust cap is also available from US Conec as part number C10063. Other example dust caps are disclosed at U.S. Pat. No. 7,565,053 to Zimmel et al., issued Jul. 21, 2009; U.S. Pat. No. 7,164,840 to Hsieh, issued Jan. 16, 2007; and U.S. Pat. No. 6,712,524 to Beatty et al., issued Mar. 30, 2004.

SUMMARY

One aspect of the present disclosure relates to a dust cap and an optical fiber connector. The dust cap extends between a distal end and a proximal end and is adapted to cover a distal end of the optical fiber connector. The dust cap includes a sleeve and at least one resilient latch. The sleeve has a central axis and defines a cavity for receiving the distal end of the optical fiber connector. The cavity extends along the central axis of the sleeve and has an open end positioned opposite from a closed end. The open end of the cavity provides the distal end of the optical fiber connector access to the cavity from the proximal end of the dust cap. The at least one resilient latch of the dust cap is within the cavity of the sleeve. The at least one resilient latch includes a cantilevered arm with a free end and a base end. The base end connects to the sleeve, and the free end extends proximally from the base end. The at least one resilient latch further includes a retainer mounted on the free end of the cantilevered arm.

The optical fiber connector includes a connector body, a ferrule, and a release sleeve. The connector body extends from a first end to a second end and defines an interior passage that extends between the first and the second ends of the connector body. The interior passage is adapted to receive optical fibers through the second end of the connector body. The connector body includes an exterior portion that defines a slide guide and a retaining pocket, and the connector body defines a slide stop. The ferrule is adapted to receive and terminate at least one optical fiber and is positioned at least partially within the interior passage of the connector body. The ferrule includes a terminal end that extends beyond the first end of the connector body. The release sleeve of the optical fiber connector is positioned over a portion of the connector body. The release sleeve extends from a first end to a second end. The first end of the release sleeve is positioned nearer the first end of the connector body, and the second end of the release sleeve is positioned nearer the second end of the connector body. The release sleeve includes a slide that slidingly connects the release sleeve to the slide guide of the connector body. The release sleeve includes a sleeve stop that is adapted to engage the slide stop of the connector body to prevent the release sleeve from sliding beyond a predetermined location on the connector body. The retainer of the at least one resilient latch of the dust cap is captured by (e.g., between) the retaining pocket of the connector body and an interior portion of the release sleeve when the dust cap is fully installed on the optical fiber connector. The captured retainer retains the fully installed dust cap on the optical fiber connector.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

FIG. 7 is a perspective view of the dust cap of FIG. 1;

FIG. 8 is the perspective view of FIG. 7 but with the right half of the dust cap cut away;

FIG. 9 is a perspective view of the dust cap of FIG. 1 with the right half of the dust cap cut away;

DETAILED DESCRIPTION

Figure 1:
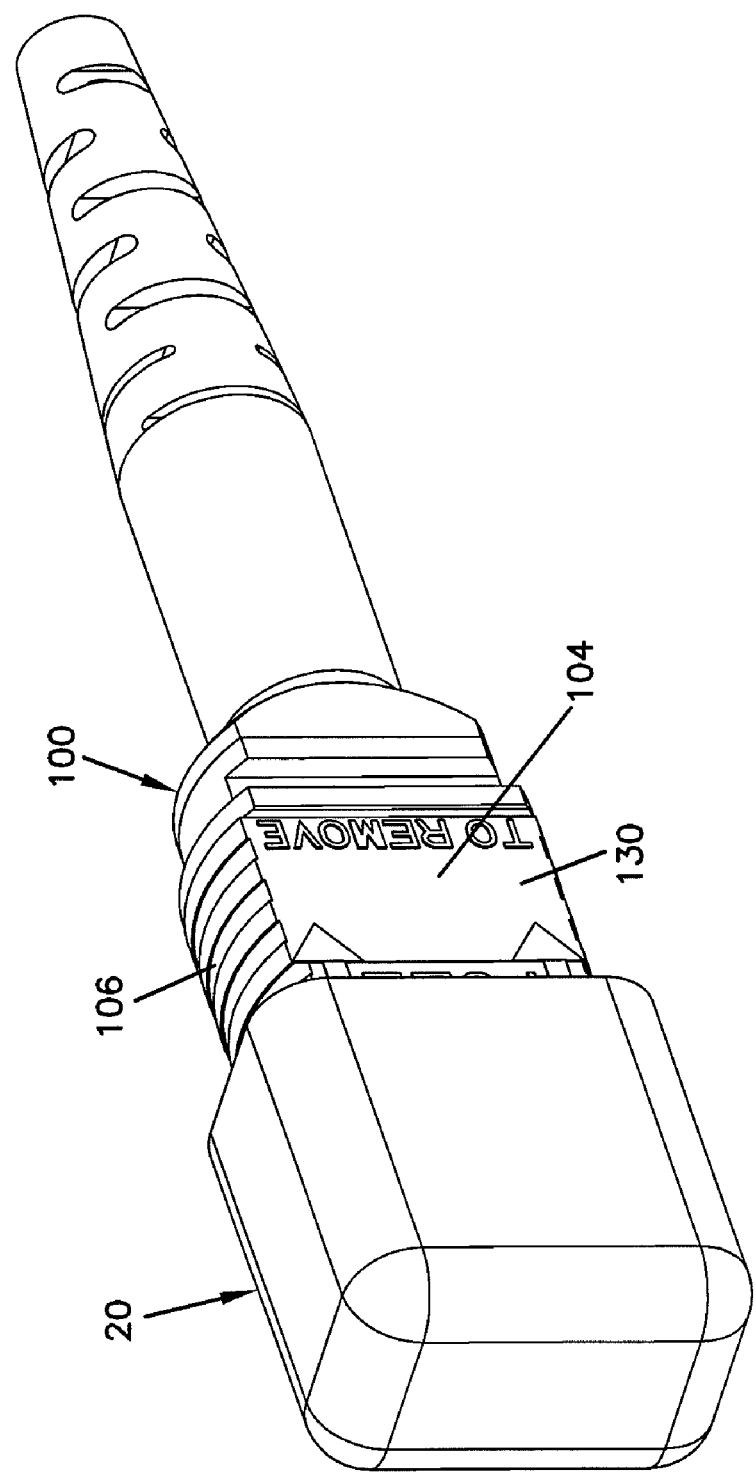
FIG. 1 is a perspective view of a dust cap assembled on an example fiber optic connector.
Figure 2:
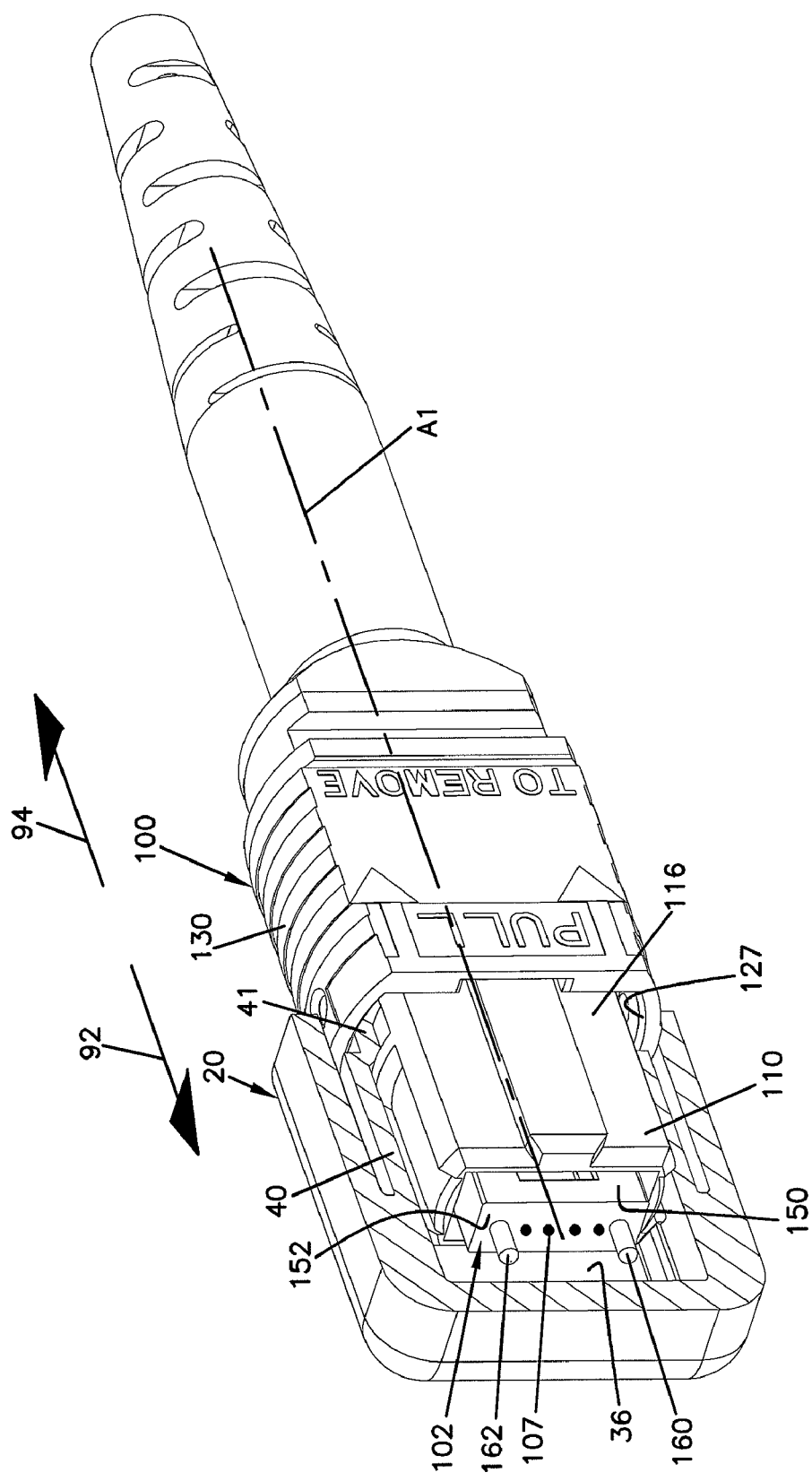
FIG. 2 is the perspective view and the dust cap and the fiber optic connector of FIG. 1 with a left half of the dust cap cut away.

The present disclosure concerns dust caps and corresponding optical fiber connectors. The dust caps can cover a distal end of the corresponding optical fiber connectors. FIGS. 1-11 illustrate an example dust cap 20 in accordance with the principles of the present disclosure. FIGS. 1, 2, and 12-16 illustrate the example fiber optic connector 100 (i.e., an optical fiber connector) that is compatible with the dust cap 20. The dust cap 20 is adapted to cover a distal end 102 of the fiber optic connector 100 and attach to the fiber optic connector 100. The distal end 102 can include a polished end face 152 of a ferrule 150. The ferrule 150 supports a plurality of optical fibers 107. The optical fibers 107 have polished ends positioned slightly distally with respect to the polished end face 152. The distal end 102 can also include alignment pins 160 that project outwardly from the polished end face 152 to an end 162 of the pin 160.

Referring to FIGS. 2 and 12-16, the example fiber optic connector 100 includes a release sleeve 130 slidingly mounted over a connector body 110. The example dust cap 20 is adapted to latch between an interior surface 127 of the release sleeve 130 and a retaining pocket 119 of the connector body 110 and thereby retain itself to the fiber optic connector 100. The example dust cap 20 is adapted to seal with the release sleeve 130 and thereby shield the end 102 of the fiber optic connector 100 from contamination. The example dust cap 20 stops against the connector body 110 when installed on the fiber optic connector 100. The example dust cap 20 includes a cavity 36 that is positioned over the distal end 102 of the fiber optic connector 100 when installed and thereby protects the polished end face 152 of the ferrule 150, the polished ends of the optical fibers 107, and the pins 160.

Figure 15:
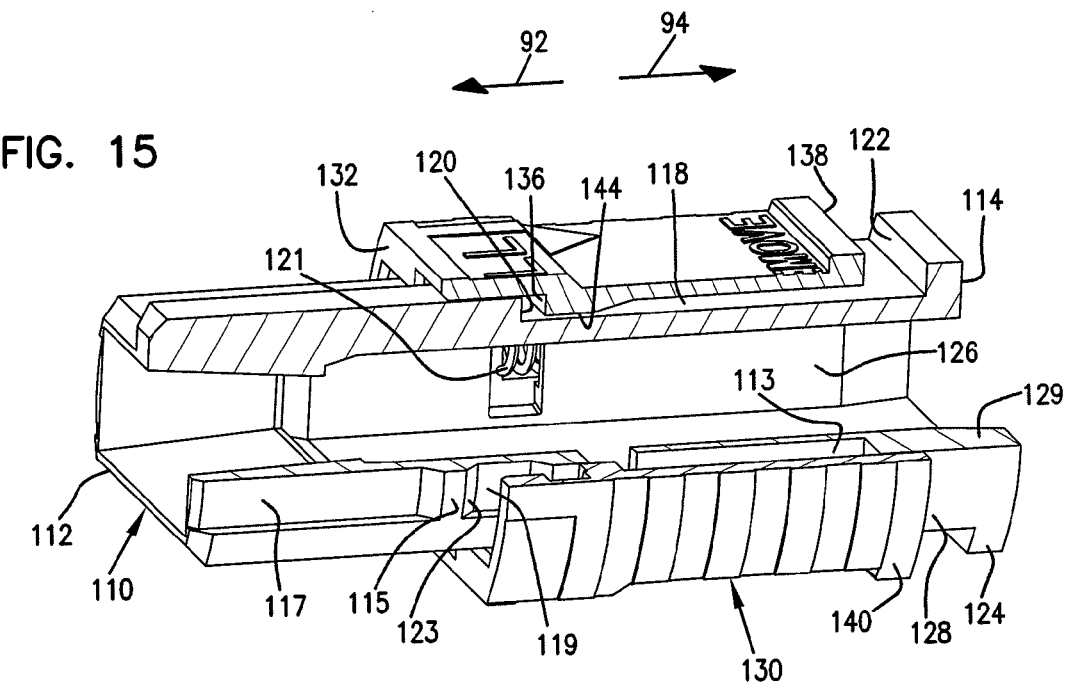
FIG. 15 is a perspective view of the connector body and the release sleeve of FIG. 12 with a lower left quarter cut away.
Figure 16:
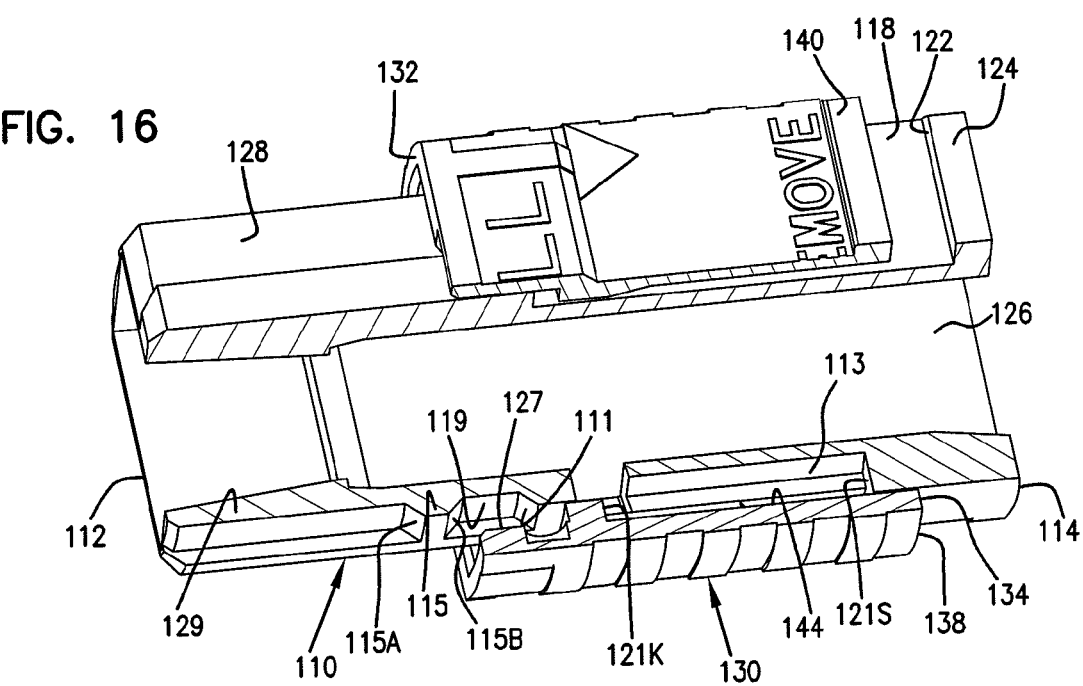
FIG. 16 is a perspective view of the connector body and the release sleeve of FIG. 12 with the lower left quarter cut away.

The connector body 110 extends from a first end 112 to a second end 114 (see FIGS. 15 and 16). The first end 112 is adapted to be inserted into a port of a fiber optic adapter, and the second end 114 connects directly or indirectly to a fiber optic cable (e.g. a group of optical fibers joined together in a flat ribbon by a polymeric coating). A flange 124 can be included at or near the second end 114 of the connector body 110 (see FIGS. 15 and 16). An interior passage 126 extends through the connector body 110 from the first end 112 to the second end 114 and is adapted to house the optical fibers and/or the ferrule 150. An exterior 128 of the connector body 110 can be separated from the interior passage 126 by one or more walls 129 of the connector body 110 (see FIGS. 15 and 16).

The release sleeve 130 of the connector 100 extends from a first end 132 to a second end 134. The release sleeve 130 is positioned around a portion of the exterior 128 of the connector body 110 with the first end 132 nearer the first end 112 of the connector body 110 and the second end 134 nearer the second end 114 of the connector body 110. A sliding surface 144 (e.g., a slide) of the release sleeve 130 can slidingly engage a sliding surface 118 (e.g., a slide guide) of the connector body 110 and thereby allow the release sleeve 130 to slide on the connector body 110 between a latch position and a release position.

The release sleeve 130 is typically biased toward the latch position (e.g., by a spring 121). The connector body 110 of the example connector 100 includes a pair of spring channels 113 that hold the springs 121 (see FIGS. 15 and 16). A spring keeper 121K is provided on the release sleeve 130 to hold a first end of the spring 121. A spring support 121S is provided at an end of the spring channel 113 on the connector body 110 to hold a second end of the spring 121.

Figure 4:
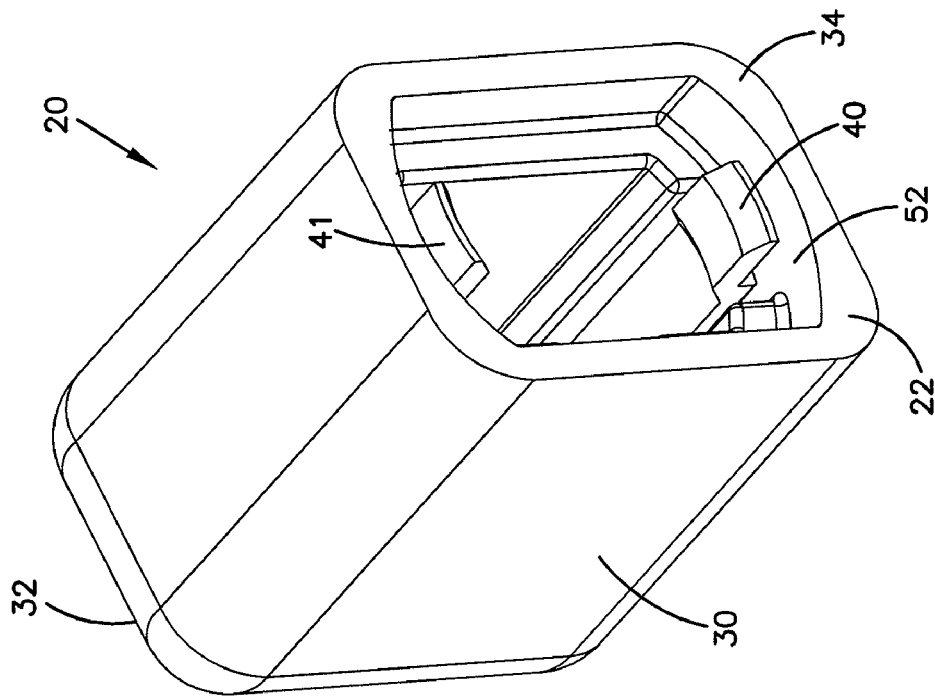
FIG. 4 is a perspective view of the dust cap of FIG. 1.
Figure 3:
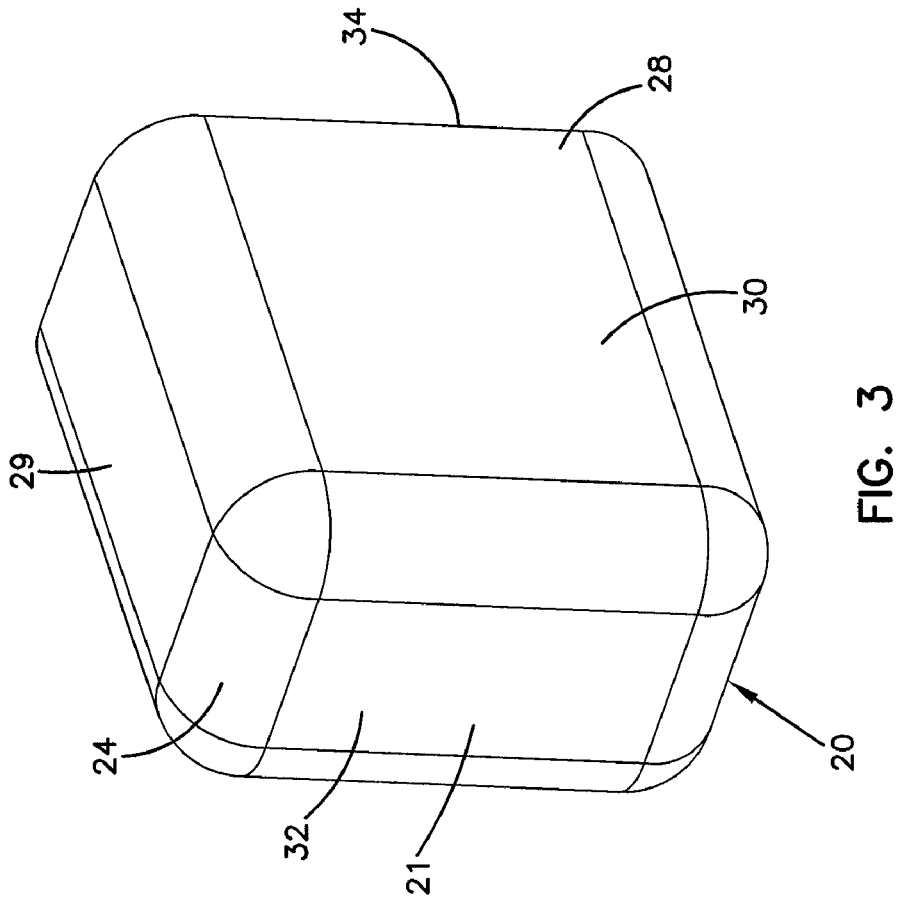
FIG. 3 is a perspective view of the dust cap of FIG. 1.
Figure 6:
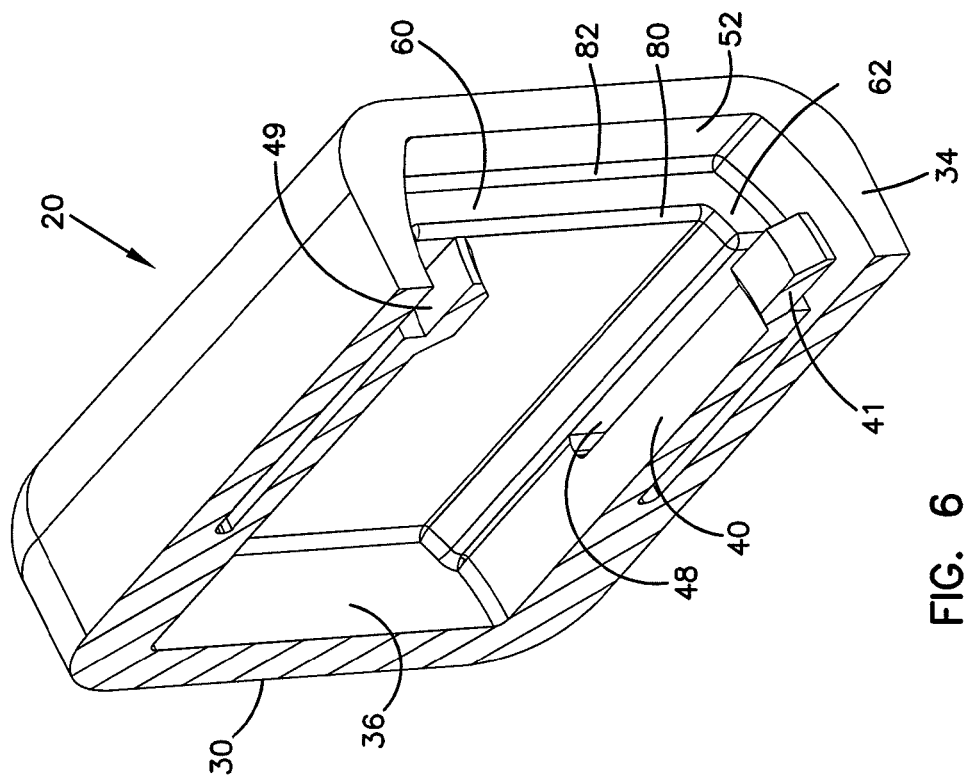
FIG. 6 is the perspective view of FIG. 4 but with the left half of the dust cap cut away.
Figure 5:
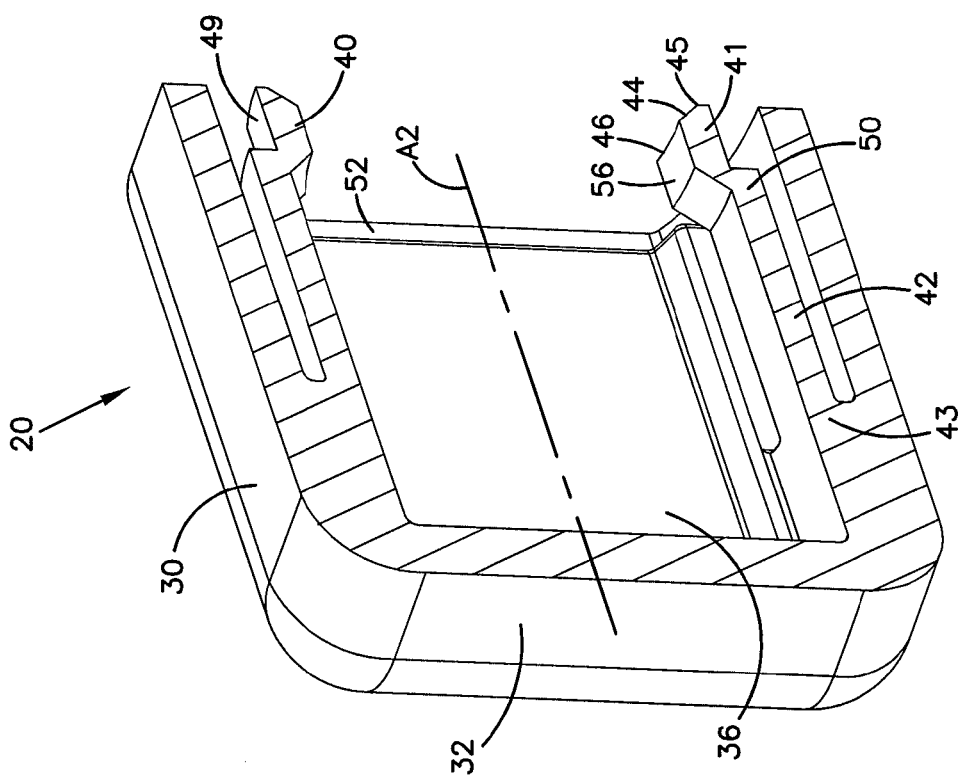
FIG. 5 is the perspective view of FIG. 3 but with the left half of the dust cap cut away.
Figure 11:
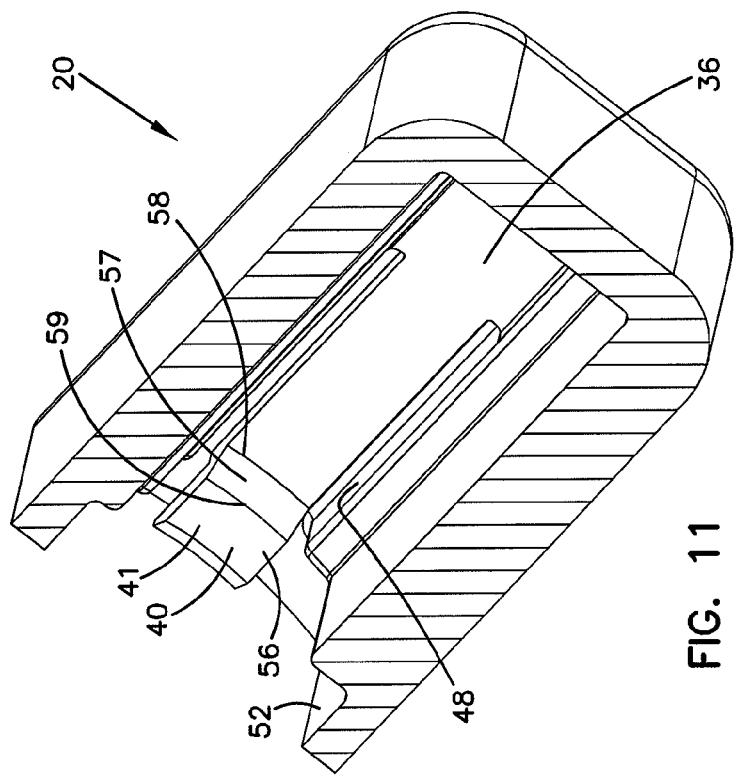
FIG. 11 is a perspective view of the dust cap of FIG. 1 with an upper half of the dust cap cut away.
Figure 10:
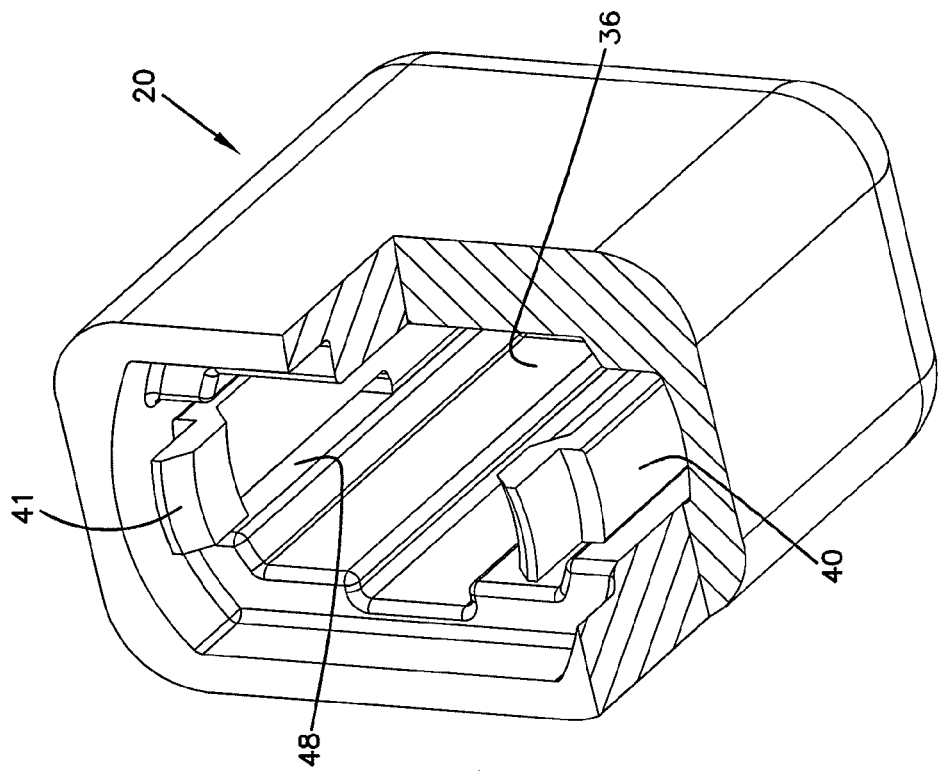
FIG. 10 is a perspective view of the dust cap of FIG. 1 with a portion of a right lower proximal corner of the dust cap cut away.
Figure 12:
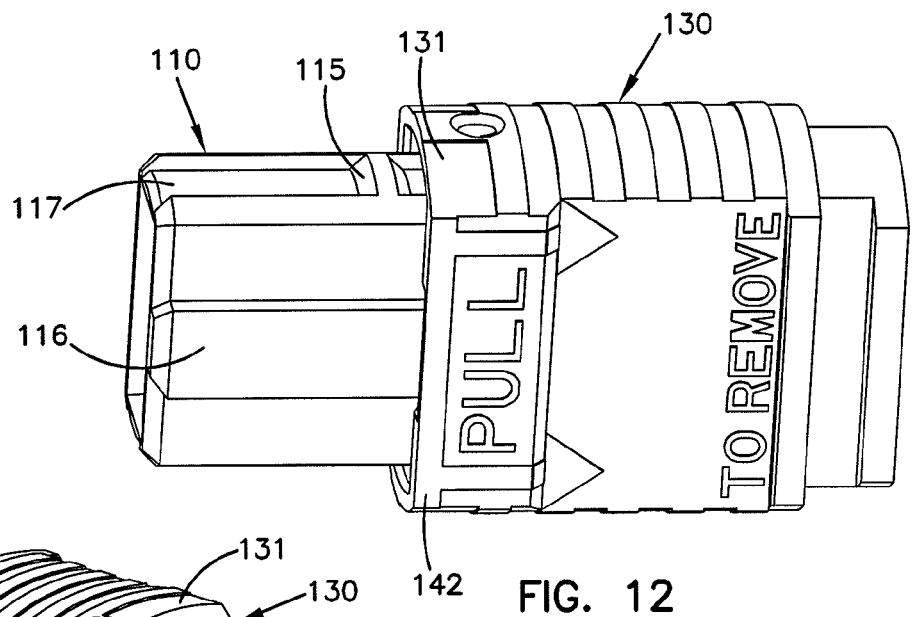
FIG. 12 is a perspective view of a connector body and a release sleeve of the example fiber optic connector of FIG. 1.
Figure 13:
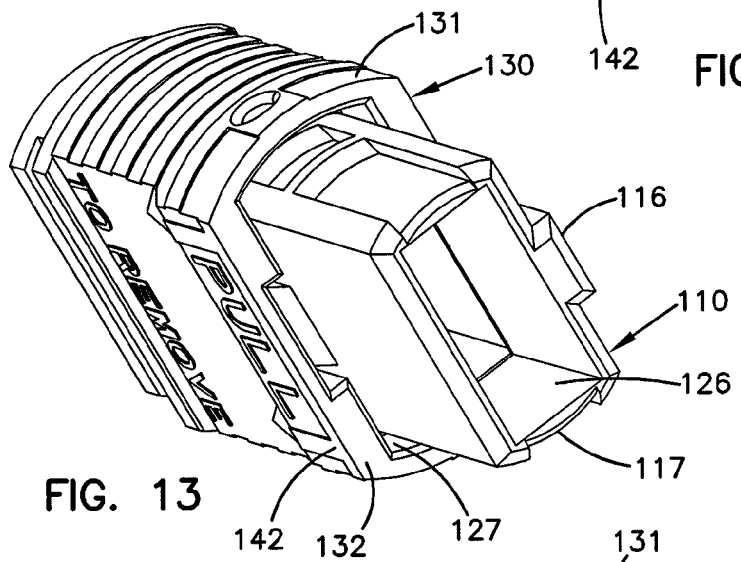
FIG. 13 is a perspective view of the connector body and the release sleeve of FIG. 12.
Figure 14:
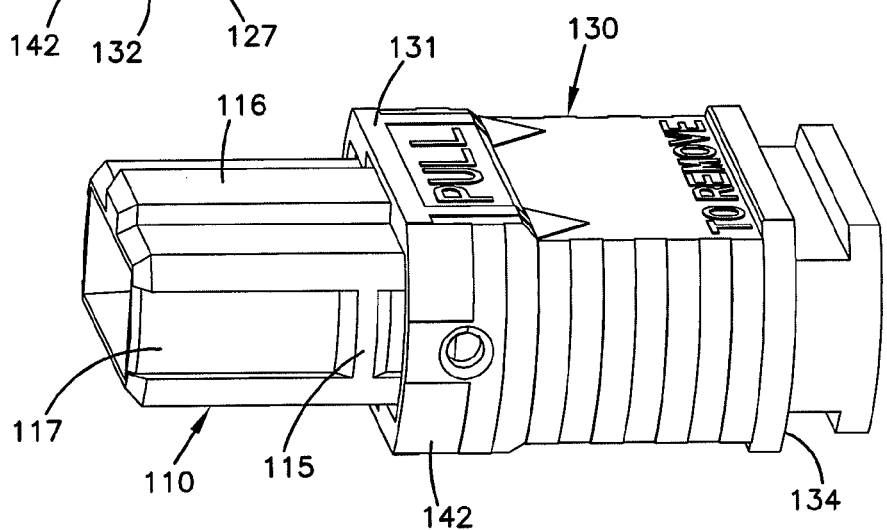
FIG. 14 is a perspective view of the connector body and the release sleeve of FIG. 12.

The dust cap 20 extends between a distal end 21 and a proximal end 22 (see FIGS. 3 and 4). The dust cap 20 includes a sleeve 30 having a closed end 32 and an open end 34 (see FIGS. 3 and 4). The sleeve 30 defines a central axis A2 (see FIG. 5) that extends from the closed end 32 to the open end 34 of the sleeve 30. The cavity 36 is formed within the sleeve 30 and includes at least one shoulder 62 forming a stop surface 60 (see FIG. 6). The stop surface 60 faces the open end 34 of the sleeve 30.

The dust cap 20 can be installed on the fiber optic connector 100 by placing the open end 34 over the end 102 of the fiber optic connector 100 and aligning a keyway 76 (see FIG. 7) of the dust cap 20 with a key 116 (see FIG. 2) of the fiber optic connector 100. Chamfers or rounds 80, of the shoulder 62 can guide the fiber optic connector 100 into the cavity 36. The central axis A2 of the sleeve 30 is then generally aligned with a central longitudinal axis A1 of the fiber optic connector 100, and the cavity 36 is positioned over at least a portion of the fiber optic connector 100. The dust cap 20 is then urged onto the fiber optic connector 100 by moving the dust cap 20 in a proximal direction 94 (see FIG. 2). Grooves 117 of the connector body 110 can function as vents and thereby allow excess air within the cavity 36 of the sleeve 30 to escape when the dust cap 20 is installed on the fiber optic connector 100.

The dust cap 20 can include a rounded nose 24 at the closed end 32 (see FIG. 3). The dust cap 20 can include broad sides (i.e., major sides) 28 and narrow sides (i.e., minor sides) 29 that generally align with a long side 104 and a short side 106 of the fiber optic connector 100 respectively (see FIGS. 1 and 3). The dust cap 20 can include a connector body covering portion 38, that primarily covers the connector body 110, and a release sleeve covering portion 39, that primarily covers the release sleeve 130 of the fiber optic connector 100. The chamfer or the round 80 can be provided within the sleeve 30 between the connector body covering portion 38 and the release sleeve covering portion 39 to guide the connector body 110 of the fiber optic connector 100 into the connector body covering portion 38 of the dust cap 20. The keyway 76 can be provided within the sleeve 30 of the dust cap 20 (see FIGS. 7-9).

A sealing surface 52 can be provided within the sleeve 30 at a location between the shoulder 62 and the open end 34 of the sleeve 30. The sealing surface 52 faces toward the central axis A2 of the sleeve 30. The sealing surface 52 is substantially parallel to the central axis A2 of the sleeve 30. The sealing surface 52 can be positioned over a portion 131 (see FIGS. 12-14) of the release sleeve 130 adjacent to the first end 132 when the dust cap 20 is installed on the fiber optic connector 100. The sealing surface 52 can be adjacent a round 82 that transitions from the sealing surface 62 to the sealing surface 52. The sealing surface 52 is adapted to overlap the portion 131 of the release sleeve 130 adjacent to the first end 132 of the release sleeve 130 of the fiber optic connector 100. The portion 131 of the release sleeve 130 is thus used as a sealing surface 142. The sealing surface 52 of the dust cap 20 seals against the sealing surface 142 of the release sleeve 130 when the dust cap 20 is installed on the fiber optic connector 100. The overlapping and/or abutting sealing surfaces 52, 142 do not have to provide an airtight seal or a watertight seal and may only provide a barrier to dust and/or other contamination from entering the cavity 36 of the dust cap 20 when the dust cap 20 is fully installed on the fiber optic connector 100. The sealing surfaces 52, 142 can be contacting surfaces and/or abutting surfaces. The first end 132 of the release sleeve 130 or a portion of the first end 132 can seal with the sealing surface (i.e., the shoulder) 62 of the cavity 36 of the dust cap 20.

At least one resilient latch 40 can be provided on the dust cap 20 within the cavity 36 of the sleeve 30. The example dust cap 20 includes a pair of the resilient latches 40 positioned on opposite sides of the central axis A2 from each other. The resilient latches 40 are positioned on the narrow sides 29 of the dust cap 20. The resilient latch 40 can include a cantilevered arm 42 extending from a base 43 (i.e., a base end) at the sleeve 30 to a cantilevered end 50 (i.e., a free end). The cantilevered arm 42 extends in a direction predominantly from the closed end 32 to the open end 34 of the sleeve 30 (i.e., in a proximal direction). Cuts 48 (i.e., slots) can be formed within the cavity 36 of the sleeve 30 of the dust cap 20. The cuts 48 can form at least a portion of a boundary of the cantilevered arm 42. The cantilevered end 50 of the cantilevered arm 42 can extend beyond the open end 34 of the sleeve 30 or the cantilevered end 50 can be within the sleeve 30, as shown at FIGS. 2 and 4-11. Alternatively, the cantilevered end 50 of the cantilevered arm 42 can substantially coincide with a plane defined by the open end 34 of the sleeve 30, or the cantilevered end 50 of the cantilevered arm 42 can be positioned between the plane of the open end 34 of the sleeve 30 and the shoulder 62 of the sleeve 30 of the dust cap 20.

The resilient latch 40 can include a retainer 41 mounted on the cantilevered end 50 of the cantilevered arm 42. The retainer 41 can be integrated with the cantilevered end 50. The retainer 41 can be formed into the cantilevered end 50. The retainer 41 can be distinct from the cantilevered end 50, as shown at FIGS. 2 and 4-11. Other configurations of the retainer 41 are also possible. As depicted, the retainer 41 includes an inclined surface 44 with a first end 46 and a second end 45 (see FIGS. 5 and 8). The second end 45 of the inclined surface 44 can be adjacent the cantilevered end 50 of the cantilevered arm 42, or the retainer 41 can be offset toward the central axis A2 from the cantilevered end 50, as depicted at FIGS. 2 and 4-11. The first end 46 of the inclined surface 44 can be positioned nearer to the closed end 32 and the central axis A2 of the sleeve 30 than the second end 45. The resilient latch 40 can include a plateau 56 adjacent the first end 46 of the inclined surface 44 (see FIGS. 5 and 8). The resilient latch 40 can include a declined surface 57 with a first end 58 and a second end 59 (see FIGS. 9 and 11). The second end 59 of the declined surface 57 can be adjacent the plateau 56, and the first end 58 of the declined surface 57 can be positioned nearer to the closed end 32 and farther from the central axis A2 of the sleeve 30 than the second end 59 of the declined surface 57.

The resilient latch 40 of the dust cap 20 automatically connects the dust cap 20 to the fiber optic connector 100 when the dust cap 20 is installed over the fiber optic connector 100. In particular, the inclined surface 44 of the retainer 41 of the resilient latch 40 spreads the cantilevered end 50 of the cantilevered arm 42 away from the central axis A2 by contacting a retaining member 115 of the connector body 110. The retaining member 115 can be included within the grooves 117 of the connector body 110. The retaining member 115 includes a first ramp 115A and a second ramp 115B (see FIG. 16). In the depicted embodiment, the inclined surface 44 slides against the first ramp 115A and thereby moves the retainer 41 away from the central axis A2 when the dust cap 20 is installed, in the proximal direction 94, over the connector body 110. As the cantilevered end 50 is coupled to or integrated with the retainer 41, the cantilevered end 50 is moved away from the central axis A2 with the retainer 41.

As the retainer 41 is moved outwardly away from the central axis A2, a pushing surface 47 (see FIGS. 8 and 9) of the retainer 41 becomes aligned with the first end 132 of the release sleeve 130 of the fiber optic connector 100. Continued proximal movement of the dust cap 20 over the fiber optic connector 100 results in the pushing surface 47 moving the release sleeve 130 in the proximal direction 94. As the retainer 41 becomes aligned with the retaining pocket 119 of the connector body 110, the cantilevered end 50 of the cantilevered arm 42 urges the retainer 41 to at least partially return toward the central axis A2. The cantilevered arm 42 thereby positions the retainer 41 within the retaining pocket 119.

When the retainer 41 is sufficiently returned toward the central axis A2, the pushing surface 47 drops off of the first end 132 of the release sleeve 130. The spring 121 of the fiber optic connector 100 urges the release sleeve 130 in a distal direction 92 (see FIG. 15) to the latch position. The latch position of the release sleeve 130 can be defined when a first stop 136 on the release sleeve 130 abuts a first stop 120 on the connector body 110. The latch position of the release sleeve 130 can also be defined when the first end 132 of the release sleeve 130 abuts the stop surface 60 of the shoulder 62 of the dust cap 20. When the release sleeve 130 is in the latch position and the retainer 41 is positioned in the retaining pocket 119, the interior surface (i.e., a trapping surface) 127 of the release sleeve 130 captures the retainer 41 by covering a keeper surface 49 of the retainer 41. The dust cap 20 is thereby secured to the fiber optic connector 100 at an installed position when the retainer 41 is trapped between the release sleeve 130 and the connector body 110. The installed position of the dust cap 20 can be determined by the inclined surface 44 and the declined surface 57 seating against an end 111 of the retaining pocket 119 and the second ramp 115B respectively. As a tapered seat 123 (see FIG. 15) is formed in the retaining pocket 119 by the second ramp 115B and the end 111, the retainer 41, and thereby the dust cap 20, can be located with precision and repeatability on the fiber optic connector 100. In a preferred embodiment, the inclined surface 44 and the declined surface 57 of the retainer 41 match the tapered seat 123 of the retaining pocket 119. The spring 121 of the fiber optic connector 100 can urge the first end 132 of the release sleeve 130 against the stop surface 60 of the dust cap 20.

The keeper surfaces 49 prevent the cantilevered arms 42 from flexing outwardly and thereby prevent unintentional removal of the dust cap 20 from the fiber optic connector 100.

To remove the dust cap 20 from the fiber optic connector 100, the release sleeve 130 of the fiber optic connector 100 is moved proximally to the release position while the dust cap 20 is urged in the distal direction 92. The release position of the release sleeve 130 can be defined when a second stop 138 of the release sleeve 130 abuts a second stop 122 of the connector body 110. The interior surface 127 of the release sleeve 130 is moved off of the keeper surface 49 of the retainer 41 when the release sleeve 130 is at the release position. Urging the dust cap 20 in the distal direction 92 spreads the retainer 41 away from the central axis A2. In a preferred embodiment, the retainer 41 is spread away from the central axis A2 by the declined surface 57 of the retainer 41 engaging the second ramp 115B of the retaining member 115 of the connector body 110 of the fiber optic connector 100. The cantilevered end 50 of the cantilevered arm 42 is moved outwardly away from the central axis A2 along with the retainer 41. The retainer 41 is thereby removed from the retaining pocket 119, and the dust cap 20 can be freely removed from the fiber optic connector 100.

The first stop 120 of the connector body 110 can be included on the key 116 (as shown at FIGS. 15 and 16) or can be included as a separate feature, and the first stop 136 of the release sleeve 130 can be included near the first end 132 (as shown at FIG. 15) or can be located elsewhere. Likewise, the second stop 122 of the connector body 110 can be included on the flange 124 (as shown at FIG. 15) or can be a separate feature, and the second stop 138 of the release sleeve 130 can be included at a flange 140 (as shown at FIGS. 15 and 16) or can be located elsewhere.

The dust cap 20 can be unitary in construction. The dust cap 20 can be molded from a plastic material. The dust cap 20 can be molded as a single piece. The example dust cap 20 can be made from a material that dissipates static electricity and thereby avoids electro-statically attracting contamination. The example dust cap 20 can be made from a material that does not outgas and thereby does not cause or contribute to contamination by out-gassing. The example dust cap 20 can be made from a rigid material and thus resist deforming under applied loads. In one embodiment, the dust cap 20 is made from a polypropylene material.

From the forgoing detailed description, it will be evident that modifications and variations can be made in the devices of the disclosure without departing from the spirit or scope of the invention.

What is claimed is:

1. A dust cap and an optical fiber connector, the dust cap adapted to cover a distal end of the optical fiber connector, the dust cap extending between a distal end and a proximal end, the dust cap and the optical fiber connector comprising:

a sleeve of the dust cap, the sleeve having a central axis and defining a cavity for receiving the distal end of the optical fiber connector, the cavity extending along the central axis of the sleeve and having an open end positioned opposite from a closed end, the open end of the cavity providing the distal end of the optical fiber connector access to the cavity from the proximal end of the dust cap;

at least one resilient latch of the dust cap within the cavity of the sleeve, the at least one resilient latch including a cantilevered arm with a free end and a base end, the base end connected to the sleeve, and the free end extending proximally from the base end, the at least one resilient latch further including a retainer mounted on the free end of the cantilevered arm;

a connector body of the optical fiber connector, the connector body extending from a first end to a second end, the connector body defining an interior passage extending between the first and the second ends of the connector body, the interior passage adapted to receive optical fibers through the second end of the connector body, and the connector body including an exterior portion that defines a retaining pocket;

a ferrule of the optical fiber connector, the ferrule adapted to receive and terminate at least one optical fiber; the ferrule positioned at least partially within the interior passage of the connector body; and the ferrule including a terminal end extending beyond the first end of the connector body; and a release sleeve of the optical fiber connector positioned over a portion of the connector body, the release sleeve extending from a first end to a second end, the first end of the release sleeve positioned nearer the first end of the connector body, the second end of the release sleeve positioned nearer the second end of the connector body, the release sleeve being slidingly mounted over the connector body; and the release sleeve being slidable between a latch position and a release position on the connector body;

wherein the retainer of the at least one resilient latch of the dust cap is captured by the retaining pocket of the connector body and an interior portion of the release sleeve when the dust cap is installed on the optical fiber connector and the release sleeve is at the latch position; and wherein the captured retainer retains the installed dust cap on the optical fiber connector.

2. The dust cap and the optical fiber connector of claim 1, further comprising a sealing surface of the dust cap, the sealing surface facing toward the central axis of the sleeve.

3. The dust cap and the optical fiber connector of claim 2, wherein the sealing surface of the dust cap is adapted to sealingly engage a perimeter of the release sleeve adjacent the first end of the release sleeve when the dust cap is installed on the optical fiber connector.

4. The dust cap and the optical fiber connector of claim 2, wherein the sealing surface of the dust cap is parallel to the central axis of the sleeve.

5. The dust cap and the optical fiber connector of claim 1, wherein the at least one resilient latch includes a pair of the resilient latches positioned on opposite sides of the central axis of the sleeve.

6. The dust cap and the optical fiber connector of claim 1, wherein the cavity of the sleeve defines a shoulder facing toward the open end of the cavity, wherein the shoulder is positioned adjacent the first end of the release sleeve when the dust cap is installed on the optical fiber connector and the release sleeve is at the latch position.

7. The dust cap and the optical fiber connector of claim 6, wherein the shoulder of the cavity of the sleeve functions as a release sleeve stop and abuts the first end of the release sleeve when the dust cap is installed on the optical fiber connector and the release sleeve is at the latch position.

8. The dust cap and the optical fiber connector of claim 1, wherein the retainer of the at least one resilient latch includes an inclined surface having a first end and a second end, the second end of the inclined surface positioned at a proximal end of the retainer and the first end of the inclined surface positioned nearer to the closed end and the central axis of the sleeve than the second end of the inclined surface, wherein the retainer of the at least one resilient latch includes a plateau adjacent the first end of the inclined surface, and wherein the retainer of the at least one resilient latch includes a declined surface having a first end and a second end, the second end of the declined surface positioned adjacent the plateau and the first end of the declined surface positioned nearer to the closed end and farther from the central axis of the sleeve than the second end of the declined surface.

9. The dust cap and the optical fiber connector of claim 8, wherein the inclined surface of the retainer of the at least one resilient latch spreads the free end of the cantilevered arm away from the central axis by contacting a first ramp adjacent the retaining pocket of the connector body when the dust cap is installed over the optical fiber connector, wherein the free end of the cantilevered arm at least partially returns toward the central axis and thereby positions the retainer at least partially in the retaining pocket when the dust cap is fully installed on the optical fiber connector, and wherein the declined surface of the retainer of the at least one resilient latch is positioned adjacent a second ramp positioned at a distal end of the retaining pocket when the dust cap is fully installed on the optical fiber connector.

10. The dust cap and the optical fiber connector of claim 9, further comprising a sealing surface of the dust cap, the sealing surface facing toward the central axis of the sleeve, wherein the sealing surface of the dust cap is adapted to sealingly engage a perimeter of the release sleeve adjacent the first end of the release sleeve when the dust cap is installed on the optical fiber connector, and wherein the sealing surface of the dust cap overlaps the first end of the release sleeve when the dust cap is fully installed on the optical fiber connector.

11. The dust cap and the optical fiber connector of claim 1, wherein the cavity of the sleeve of the dust cap houses the terminal end of the ferrule of the optical fiber connector and has a clearance spacing with the terminal end when the dust cap is fully installed on the optical fiber connector.

12. The dust cap and the optical fiber connector of claim 1, further comprising a spring of the optical fiber connector, the spring biasing the release sleeve of the optical fiber connector from the release position toward the latch position.

13. The dust cap and the optical fiber connector of claim 12, wherein the release sleeve includes a first sleeve stop and a second sleeve stop and the connector body includes a first slide stop and a second slide stop, wherein the latch position of the release sleeve on the connector body is reached when the first sleeve stop abuts the first slide stop, wherein the release position of the release sleeve on the connector body is reached when the second sleeve stop abuts the second slide stop, wherein the first end of the release sleeve is nearer to the first end of the connector body when the release sleeve is at the latch position and the first end of the release sleeve is farther from the first end of the connector body when the release sleeve is at the release position; and wherein the spring urges the first sleeve stop of the release sleeve toward the first slide stop of the connector body.

14. The dust cap and the optical fiber connector of claim 1, further comprising at least one keyway of the dust cap and a key of the optical fiber connector, the at least one keyway adapted to receive the key.

15. A dust cap for use on a fiber optic connector, the dust cap comprising:
a sleeve having a central axis and defining a cavity for receiving an end of the fiber optic connector, the cavity extending along the central axis of the sleeve and having an open end positioned opposite from a closed end;
a sealing surface facing toward the central axis of the sleeve, the sealing surface adapted to sealingly engage a perimeter of a release sleeve of the fiber optic connector when the dust cap is fully installed on the fiber optic connector; and
at least one resilient latch within the cavity of the sleeve, the at least one resilient latch including a cantilevered arm with a free end and a base end, the base end connected to the sleeve, and the free end extending proximally from the base end, the at least one resilient latch further including a retainer mounted on the free end of the cantilevered arm, the retainer adapted to be captured between a retaining pocket of a connector body of the fiber optic connector and an interior portion of the release sleeve of the fiber optic connector when the dust cap is installed on and retained on the fiber optic connector.

16. The dust cap of claim 15, wherein the retainer of the at least one resilient latch includes an inclined surface having a first end and a second end, the second end of the inclined surface positioned at a proximal end of the retainer and the first end of the inclined surface positioned nearer to the closed end and the central axis of the sleeve than the second end of the inclined surface, wherein the retainer of the at least one resilient latch includes a plateau adjacent the first end of the inclined surface, and wherein the retainer of the at least one resilient latch includes a declined surface having a first end and a second end, the second end of the declined surface positioned adjacent the plateau and the first end of the declined surface positioned nearer to the closed end and farther from the central axis of the sleeve than the second end of the declined surface.

17. The dust cap of claim 15, wherein the retainer of the at least one resilient latch includes an inclined surface having a first end and a second end, the second end of the inclined surface positioned at a proximal end of the retainer and the first end of the inclined surface positioned nearer to the closed end and the central axis of the sleeve than the second end of the inclined surface and wherein the retainer of the at least one resilient latch includes a declined surface having a first end and a second end, the first end of the declined surface positioned nearer to the closed end and farther from the central axis of the sleeve than the second end of the declined surface.

18. The dust cap of claim 16, wherein the retainer of the at least one resilient latch and the free end of the cantilevered arm are spread away from the central axis by the inclined surface of the retainer contacting a first ramp adjacent the retaining pocket of the connector body when the dust cap is installed over the fiber optic connector, wherein the retainer and the free end of the cantilevered arm at least partially return toward the central axis thereby positioning the retainer at least partially in the retaining pocket when the dust cap is installed on the fiber optic connector, and wherein the declined surface of the retainer of the at least one resilient latch is positioned adjacent a second ramp positioned at a distal end of the retaining pocket when the dust cap is fully installed on the fiber optic connector.

19. The dust cap of claim 18, wherein the proximal end of the retainer is adapted to push an end of the release sleeve of the fiber optic connector and thereby move the release sleeve from a latch position to a release position on the connector body when the dust cap is installed over the fiber optic connector and the retainer is spread away from the central axis by the inclined surface of the retainer contacting the first ramp.

20. The dust cap of claim 19, wherein moving the release sleeve from the latch position to the release position on the connector body allows the retainer to be received in the retaining pocket of the connector body.

21. The dust cap of claim 20, wherein the proximal end of the retainer is adapted to cease pushing on the end of the release sleeve when the retainer is received in the retaining pocket of the connector body, wherein a spring of the fiber optic connector urges the release sleeve toward the latch position, and wherein the retainer is adapted to allow the release sleeve to be moved to the latch position by the spring when the retainer is received in the retaining pocket.

22. The dust cap of claim 21, wherein the retainer is adapted to be captured by the release sleeve when the release sleeve is moved to the latch position when the retainer is in the retaining pocket.

23. The dust cap of claim 22, wherein the dust cap is adapted to be removed from the fiber optic connector by moving the release sleeve to the release position and urging the dust cap in the distal direction.

24. The dust cap of claim 23, wherein the retainer is adapted to be spread away from the central axis when the dust cap is urged in the distal direction, the declined surface contacting the second ramp and thereby spreading the retainer and the cantilevered arm away from the central axis.

25. The dust cap of claim 15, wherein the at least one resilient latch includes a pair of the resilient latches positioned on opposite sides of the central axis of the sleeve.

26. A dust cap for use on a fiber optic connector, the dust cap comprising:
- a sleeve having a central axis and defining a cavity for receiving a distal end of the fiber optic connector, the cavity extending along the central axis of the sleeve and having an open end positioned opposite from a closed end;
- a sealing surface adapted to seal the distal end of the fiber optic connector when the dust cap is installed on the fiber optic connector; and
- at least one resilient latch within the cavity of the sleeve, the at least one resilient latch including a retainer, the retainer being captured between a retaining pocket of a connector body of the fiber optic connector and an interior portion of a release sleeve of the fiber optic connector when the dust cap is installed on and retained on the fiber optic connector.

* * * * *